Figure 1:
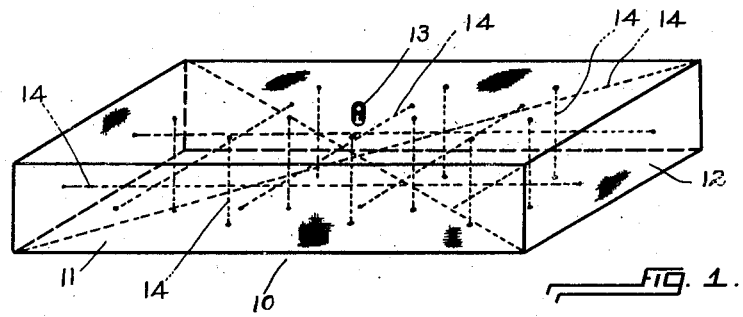

Feb. 29, 1944.     W. M. GARDNER     2,343,005
CORE FOR MANUFACTURE OF FUEL TANKS
Filed April 29, 1941

INVENTOR
William M. Gardner
by Christy, Parmelee and Strickland
his attorneys

Patented Feb. 29, 1944

2,343,005

UNITED STATES PATENT OFFICE 2,343,005

CORE FOR MANUFACTURE OF FUEL TANKS

William M. Gardner, Pittsburgh, Pa., assignor to Gardner Display Company, a corporation of Pennsylvania Application April 29, 1941, Serial No. 390,898

3 Claims. (Cl. 18—45)

This invention relates to a core for manufacture of fuel tanks and particularly to such tanks which have linings, made of rubber layers of various characteristics and which are used to form certain inside layers of a fuel tank such as is useful in aircraft.

Modern day aircraft and particularly those used for military purposes are advantageously equipped with fuel tanks which are not injuriously affected by the perforations caused by bullets and like projectiles. Such tanks are usually laminated and commonly include a layer of such a composition, that when pierced the material of the layer around the hole will flow or expand and seal the aperture, thus cutting off leakage. A useful material for this layer is what is known as "sponge rubber." The more common practice is to include in the tank an outer re-enforcing layer of metal, the inner layers forming the tank being made of various materials.

It is the practice to form the tank from layers of rubber, some of which are natural and some are synthetic, over a hollow core of readily destructible material, such as papier-mâché. After the layers of the proper composition have been applied, the core is broken up and removed through the sizable opening which is left in such tanks. The formed tank is then assembled by inserting it in a metal protective shell, or in some instances placed in a prepared space of suitable proportions in the aircraft.

The use of a frangible mold, whether of papier-mâché or of other material such as plaster of Paris, requires that a new core or mold be used for each tank. This is expensive. Furthermore, due to the obvious necessity of ensuring that the inner surface of the tank is free of particles, great care must be exercised to see that such particles are removed or caused to permanently adhere to the tank walls. This further enhances the manufacturing cost.

I have invented an inflatable, braced core over which the tank can be molded and after the core or mold has served its purpose it can be collapsed and removed through a comparatively small opening. The mold can be used over and over and no particles thereof will remain in the rubber tank. The convenience attending the use of my invention is manifest. The cost of molding is reduced and production accelerated.

In short, my invention contemplates the molding of the tank layers around an inflatable core device of novel construction preferably formed of non-extensible or relatively non-extensible airtight and flexible material. The retention of the desired shape when inflated, even though the shape be of irregular contour, is insured by a system of interior flexible bracing.

In the drawing I have shown for purpose of illustration only, certain preferred embodiments of my invention. It is to be understood that these showings are exemplary only.

Figure 2:
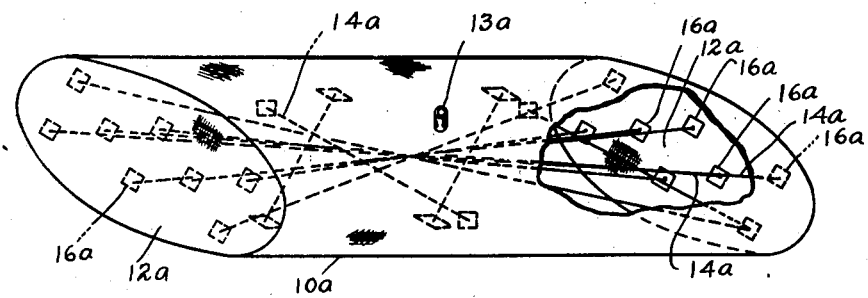
Figure 4:
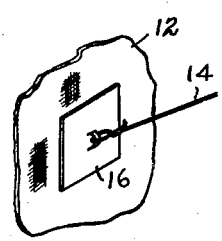
Figure 3:
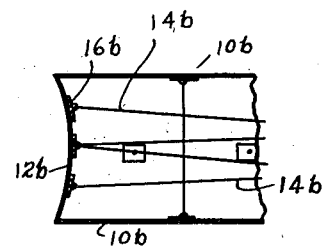

Figure 1 is a view in perspective of a mold for a rectangular flat-sided tank, showing the internal bracing, Figure 2 is a view in perspective and partly broken away of a mold for a tank of oval cross section, Figure 3 is a cross sectional view of a tank, the end of which is dished inwardly, and Figure 4 is a view in perspective and to larger scale of a detail.

In Figure 1 of the drawing there is shown a tank mold 10 which is rectangular in section with flat side walls 11 and flat end walls 12. The mold is made from an air-tight inextensible fabric, such as cloth impregnated with rubber, and in a convenient location, a filling device 13 is placed. Inside the mold a number of flexible inextensible braces or stays 14, such as cords or webs, extend between the various walls, so as to prevent objectionable bulging of the walls of the tank mold when it is inflated, by means of fluid, such as air or water under pressure—introduced through the filling device 13. The ends of the braces 14 are secured to various walls at spaced apart locations. A convenient and practical way of making this connection is illustrated in Figure 4. In that figure there is shown a plate 16 which is adapted to be secured at any desired point to the inside of the mold walls. The plate may be of metal or fibre, rubber or textile, etc., of a size which is not too large to be drawn through the opening which is left in the finished lining. A number of these plates are secured to the walls in any desired way, such as by vulcanizing, cementing, stitching, etc. A loop 16 is secured to the plate and the brace 14 in turn is secured to the loop. Usually two plates, one at each end, are provided for each brace, although the ends of a number of braces may be fastened to one plate.

In Figure 2, there is shown an elongated tank mold 10a of inextensible flexible material which is oval in cross section, the end walls 12a being flat. Secured to the sides and ends are plates 16a which are connected by flexible inextensible braces 14a formed, for example, from textiles. I prefer to have the braces connected to plates in the opposite walls, in such manner that the braces cross one another, although I also contemplate that the braces 14a may be connected to diagonally opposite plates. A filling plug 13a is provided through which fluid may be passed to or from the interior of the mold.

Figure 3 illustrates a portion of a vertical cross section of a tank mold 10b having an inwardly dished end wall 12b and braces 14b and plates 16b. While I prefer to use non-extensible, air-tight material for the tank walls, I can also advantageously use extensible air-tight material, such as sheet rubber. Where sheet rubber is used, the braces in general should be more numerous and sufficient plates provided in those walls which would normally tend to bulge, and arranged closely together, to prevent or minimize objectionable bulging.

In the manufacture of the tank lining, the mold of appropriate dimensions is filled through the filling device with a fluid under pressure until the mold is extended to its predetermined size and the walls made rigid enough to permit molding. This fluid is usually air, but may be a liquid. The braces insure that there is no objectionable bulging, no matter what the shape of the mold is. The layers of various materials, e. g., synthetic rubber for the inner layer (applied directly over the mold), a sponge rubber sealing layer over the inner layer, a layer of ordinary rubber over the sealing layer and a layer of leather or rawhide over the ordinary rubber are applied to form the tank. After the desired tank has been molded around the mold and cured, the mold is deflated or emptied and collapsed whereupon it is drawn out of the molded lining through the hand hole which is always present therein. There are no loose particles to remain in the molded tank and the mold can be re-used.

If desired, the tank may have integral partitions separating the interior of the tank into compartments to prevent or minimize sloshing of the fuel when the tank is in use. In such instances, a separate mold is provided for each compartment, the required number of molds being assembled with interposed partitions, for example, of fibre, and the tank is formed over the assembled mold. After the tank has been formed, the molds or cores are removed.

While I have described certain presently referred embodiments of my invention, it is to be understood that the invention may be otherwise embodied and practised within the scope of the following claims.

I claim:

1. A core on which a fuel tank any cross section of which is noncircular can be molded, said core comprising a hollow, inflatable body formed of fluid tight inextensible, flexible material, a plurality of flexible, inextensible interior stays connected to opposed spaced apart points on the core so as to confine the core to a single predetermined shape and size at all times when inflated which shape includes at least one plane surface.

2. A hollow core of predetermined size and contour on which a fuel tank any cross section of which is noncircular can be molded, comprising a hollow inflatable body having walls of flexible, inextensible, air-tight material, certain of said walls having plane surfaces, and a plurality of interior stays of flexible inextensible material secured to the inner surfaces of the walls at spaced apart opposed points, said stays extending in directions which are angularly disposed to one another, means whereby the stays may be secured to the mold wall and means through which fluid under pressure may be admitted or released from the body.

3. A hollow core having side walls and end walls for use as a form about which to mold the interior surface of a fuel tank, certain of said walls having plane surfaces, said walls being made of flexible and inextensible sheet like material and being fluid tight, and interior stays of flexible, inextensible material connected to the inner surfaces of said walls for holding the walls in fixed predetermined shape and size.

WILLIAM M. GARDNER.